United States Patent [19]
Itagaki et al.

[11] Patent Number: 4,976,976
[45] Date of Patent: Dec. 11, 1990

[54] FEED ADDITIVE FOR RUMINANTS

[75] Inventors: Takaharu Itagaki; Hiroyoshi Okada; Masao Miyake; Takaaki Kobayashi, all of Yokohama; Takahumi Tosa, Kawasaki; Hiroyuki Satou, Yokohama, all of Japan

[73] Assignees: Mitsubishi Kasei Corporation; Ajinomoto Company, Incorporated, both of Tokyo, Japan

[21] Appl. No.: 369,052

[22] Filed: Jun. 21, 1989

Related U.S. Application Data

[63] Continuation of Ser. No. 178,602, Apr. 7, 1988, Pat. No. 4,937,083.

[51] Int. Cl.$^5$ .............................................. A23K 1/22
[52] U.S. Cl. ........................................ 426/69; 426/72; 426/74; 426/302; 426/656; 426/807
[58] Field of Search ..................... 426/72, 74, 69, 302, 426/807, 636, 623, 630; 424/482, 489

[56] References Cited

U.S. PATENT DOCUMENTS

| | | | |
|---|---|---|---|
| 4,044,169 | 8/1977 | Bertram | 426/69 |
| 4,109,019 | 8/1978 | Moore | 426/69 |
| 4,177,255 | 12/1979 | Dannelly | 424/489 |
| 4,181,708 | 1/1980 | Dannelly et al. | 424/482 |
| 4,181,709 | 1/1980 | Dannelly et al. | 424/482 |
| 4,181,710 | 1/1980 | Dannelly et al. | 424/482 |
| 4,196,187 | 4/1980 | Dannelly et al. | 424/489 |
| 4,717,567 | 1/1988 | Wu et al. | 424/482 |

*Primary Examiner*—R. B. Penland
*Attorney, Agent, or Firm*—Oblon, Spivak, McClelland, Maier & Neustadt

[57] ABSTRACT

A feed additive for ruminants, which comprises core containing a carbamate of a basic amino acid and coated with a polymer coating agent soluble or swellable in water in an acidic region of a pH of at most 5.

10 Claims, No Drawings

FEED ADDITIVE FOR RUMINANTS

This is a continuation of application Ser. No. 07/178,602, filed on Apr. 7, 1988, now U.S. Pat. No. 4,937,083.

The present invention relates to a feed additive for ruminants. More particularly, it relates to a feed additive for ruminants wherein a biologically active substance is protected so that when it is orally administered, it will not be decomposed in the rumen of the ruminant, and it will be digested or absorbed in the abomasum or subsequent digestive tract at high efficiency.

The ruminant possesses a complex stomach consisting of four morphologically distinct compartments. These compartments are rumen, reticulum, omasum and abomasum. The former two are derived from the terminal portion of the esophagus, and only the latter two are considered to be a genuine stomach. After passing the first two compartments, the food is returned to the mouth. The rumen and the reticulum are fermentation compartments wherein *Ophryoscolex*, *Diplodinium* and *Plectridium cellulolyticum* are commensal, and the digestion of the feed (vegetable tissues) is conducted by cellulase, amylase or cellobiase secreted by these microorganisms (digestive symbiosis). At the same time, in the first stomach, the feed is wetted, mixed up and stored, and in the subsequent second stomach, the feed is formed gradually into nodules by the action of the inner honeycomb wall. Then, the content in the first and second stomachs is disgorged to the oral cavity by reflex succession of the sucking period due to contraction of the diaphragm and expansion of the esophagus and the pressing out period due to closing of the cardiac orifice and contraction of the thorax, and the cud is again subjected to mastication so-called rumination. The rumination is usually observed during the resting time of the animal upon expiration of from 0.5 to 1 hour after the intake of the feed.

The fluidized food formed by the repetition of this process is finally gulped down to the third stomach when the lobed membrane at the upper portion of the second stomach reflexly forms an esophagus channel. The omasum sends the ruminated feed to the abomasum. At the fourth stomach, usual gastric digestion with the gastric juice is conducted for the first time. (Iwanami Biology Dictionary, third edition, published by Iwanami Shoten in 1984, p. 1040 "Ruminant Stomach").

All proteins present in animals are compounds constituted by combinations of more than 20 different amino acids. Among these amino acids, ten essential amino acids are not adequately synthesized in the animal body, and the animals must take them in. The amino acids constituting a protein are specific to the protein and can not be changed. Accordingly, among the essential amino acids, the least supplied controls the amount of the protein to be produced by the animal.

In the case of ruminants, there is a problem that when a biologically active substance is, for instance, orally administered, a substantial part of the proteins and amino acids will be decomposed to ammonia or carbon dioxide gas by e.g. microorganisms in the rumen, whereby it is difficult to effectively utilize the proteins and amino acids.

Accordingly, when nutrients or drugs to be administered to ruminants are to be prepared, it is important to protect a biologically active substance such as a vitamin, an amino acid or a drug which should be protected under the environmental condition in the first stomach i.e. from the decomposition by microorganisms and from the influence of the weakly acidic or weakly alkaline pH, so that the biologically active substance can be maintained as it is until it reaches the intended digestive or absorptive site. Namely, it is desirable that the feed passes through the rumen to the omasum without being affected by microorganisms, and digestion is conducted in the abomasum and the digested feed is absorbed by the small intestine.

It is well known that the productivity of milk, meat and wool is improved, as the limited amino acids and the drugs are not susceptible to the change by microorganisms in the rumen and can be absorbed in the small intestine or subsequent digestive organ. (Abe Matanobu, Nippon Chikusan Gakkaiho 51(1) 1 (1980)).

In order to suppress the decomposition of a biologically active substance in the rumen so as to increase the absorption efficiency in the small intestine, it has been proposed, for example, to use as a feed additive a protected amino acid prepared by coating a particulate amino acid containing D,L-methionine or L-lysine hydrochloride with a synthetic polymer (J. A. Rogers, U. Krishnamoothy and C. J. Sniffen, J. Dairy Sci., 70, 789 (1987)).

Further, it has been proposed to use as a core material a mineral acid salt (typically a hydrochloride) of a basic amino acid and as a coating agent a synthetic polymer such as cellulose propionate 2-morpholinobutyrate or vinyl pyridines copolymerized with vinyl acetate, acrylonitrile or styrene (Japanese Examined Patent Publication No. 41203/1987 and Japanese Unexamined Patent Publication No. 88843/1986).

It is desirable that the biologically active substance reaches the abomasum or subsequent organ so that it will be absorbed by the small intestine. However, it has been difficult to let it reach the desired organ intact even if it is fed as incorporated in a feed as it is. Under the circumstances, it has been attempted to coat a granulated product containing this substance with a polymer having a high sensitivity to acids, such as cellulose propionate 2-morpholinobutyrate or vinyl pyridines copolymerized with vinyl acetate, acrylonitrile or styrene so that it may reach the desired site. However, no adequate effect has been obtained by the coating only with a polymer having a high sensitivity to acids.

Japanese Examined Patent Publication No. 41203/1987 discloses that the protection in the rumen can be attained by additionally using a basic substance such as basic magnesium carbonate or magnesium hydroxide in the case of coating a biologically active substance such as L-lysine monohydrochloride, which has quite high solubility in water and an aqueous solution of which is acidic.

It is generally considered that for smooth transfer of the feed in the stomach of a ruminant and for efficient digestion and absorption, the specific gravity of particles of biologically active substance having a protective coating is preferably close to the specific gravity of the gastric fluid (about 1.02), and it is undesirable that such particles settle at the bottom of the stomach of float on the surface of the content in the rumen, since their retention time then tends to be too long. The combined use of the biologically active substance and the basic inorganic compound has had a problem that the specific gravity of the product as a feed for ruminants tends to be high. Namely, the specific gravities of basic magnesium carbonate and magnesium hydroxide are 2.16 (Chemical Grand Dictionary 7, compiled by the commitee for compiling Chemical Grand Dictionary, p. 449, published by Kyoritsu Shuppan K. K. in 1987) and 2.4 (Chemical Grand Dictionary 5 compiled by the committe for compiling Chemical Grand Dictionary, p. 37, published by Kyoritsu Shuppan K. K. in 1987), and if such an inorganic filler is incorporated, the specific gravity of the resulting granulated product tends to be too high.

On the other hand, among biologically active substances, those having low solubility in water, such as D,L-methionine as an amino acid, or vitamin A, vitamine $B_{12}$, vitamin $D_1$, vitamin $D_2$, vitamin $D_3$, vitamin $D_4$, vitamins E and vitamins $K_1$ as vitamins, have had a problem that although they can be protected in the rumen, they have poor disintegrating properties in the abomasum and are not effectively utilized.

Accordingly, it has been desired to develop a method whereby in the case of a biologically active substance having high solubility in water, the specific gravity of the product as a feed for ruminants will not be too high and its protection in the rumen can be improved, and in the case of a biologically active substance having low solubility in water, its elution in the abomasum can be improved.

The present invention provides a feed additive for ruminants, which comprises core containing a carbamate of a basic amino acid and coated with a polymer coating agent soluble or swellable in water in an acidic region of a pH of at most 5.

Now, the present invention will be described in detail with reference to the preferred embodiments.

In the present invention, ruminants include, for example, cattle for meat, cows for milk, calves, sheep and goat.

The feed additive for ruminants of the present invention is required to be orally administered to ruminants. For this purpose, the particle shape is desired to be suitable for coating. Namely, it is preferred to form a coating layer having a uniform thickness on the core in the form of a continuous film. For this purpose, the shape of the core is preferably spherical. However, it may not necessarily be spherical.

The particle diameter of the additive of the present invention is usually preferably within a range of from 0.4 to 5 mm, more preferably from 0.8 to 3.5 mm. If the particle diameter is less than 0.4 mm, the surface area thereof tends to be so large that the stability in the rumen will be low. On the other hand, if the particle diameter exceeds 5 mm, the possibility of being crushed with the teeth will increase, and the possibility to reach the abomasum will accordingly be low.

The particles of the additive of the present invention are required to have a specific gravity suitable for passing through the stomach of ruminants i.e. a specific gravity at a level of from 1 to 1.4 and further required to have permissible odor, taste, texture and stability.

What is applied to the ruminants according to the present invention is a carbamate of a basic amino acid or a biologically active substance to be used in combination with the carbamate of a basic amino acid.

The basic amino acid constituting the carbamate includes L-lysine, L-arginine, L-histidine, L-hydroxylysine, L-ornithine. Particularly preferred as the carbamate of a basic amino acid is a L-lysine salt of L-lysine carbamate or an ornithine salt of ornithine carbamate.

These salts may be used alone or in combination of two or more different kinds. The carbamate of a basic amino acid is used preferably in an amount of from 0.5 to 99.8% by weight, more preferably from 2.0 to 99.8% by weight, based on the total amount of the core.

The carbamate of a basic amino acid can be readily prepared by conducting the neutralization reaction at room temperature or under heating in the presence of water or an organic solvent. It is also possible to conduct the reaction in the absence of a solvent.

The biologically active substance to be used in combination with the carbamate of a basic amino acid, may be a nutrient or a feed containing a nutrient, or a medicine. For instance, it may be selected from the group consisting of amino acids, salts of amino acids, amino acid derivatives, hydroxyl analogues of amino acids, proteins, vitamines, carbohydrates and veterinary medicines. Specifically, it includes amino acids such as D,L-methionine, L-lysine, L-tryptophan, L-threonine, L-leucine and L-arginine; salts of amino acids such as L-lysine hydrochloride and L-histidine hydrochloride; amino acid derivatives such as N-acylamino acid and N-hydroxylmethylmethionine; hydroxy analogues of amino acids such as 2-hydroxy-4-mercaptobutyric acid and its salts, powders of natural nutrients such as grain powder, feather powder and fish powder; proteins such as casein, corn protein and potato protein; vitamins such as vitamins of group A, vitamins of group B, vitamins $D_2$ and vitamins E; carbohydrates such as starch, glucose and cane sugar; and veterinary medicines such as antibiotics, vermicides and hormones.

For the combined use of the carbamate of a basic amino acid and the biologically active substance, the core may be made of a mixture of the carbamate of a basic amino acid and the biologically active substance, or the core may be prepared by coating the biologically active substance with a coating layer containing the carbamate of a basic amino acid.

All the materials to be used in the present invention must be acceptable to ruminants.

Although not based on any established theory, the present inventors consider the reason why the use of the carbamate of a basic amino acid is effective, as follows:

When the coated particles fed to a ruminant reach the stomach where the pH is acidic i.e. the abomasum, the carbamate will be decomposed by the acidic substance such as hydrochloric acid in the gastric fluid which penetrates through the coating layer into the interior of the particles, to form the basic amino acid and carbon dioxide gas. The basic amino acid will react with gastric acid to form a salt, which is readily soluble in water, whereby when other biologically active substance is present, the elution of such a substance is promoted. Further, by the generation of carbon dioxide gas, the disintegration of the particles is accelerated from the interior of the particles, whereby the disintegration of the coated particles of the present invention is further facilitated. For this reason, when the biologically active substance hardly soluble in water is present, its elution is facilitated, and consequently, the release of the core material is believed to be facilitated.

Conventional granulating methods such as extrusion granulation, fluidized bed granulation, rolling granulation, agitation granulation, centrifugal fluidized granulation and centrifugal fluidized granulation coating, may be employed for the preparation of the core containing the carbamate of a basic amino acid, the core containing a mixture of the carbamate of a basic amino acid and the biologically active substance or the particles of the biologically active substance to be coated with a coating layer containing the carbamate of a basic amino acid.

When a granulating method involving a flow or rotary motion of particles such as centrifugal fuidized granulation is used for the preparation of the core containing the carbamate of a basic amino acid, seed core gradually grow during the granulation process. Such seed core may not necessarily have the same composition as the carbamate of a basic amino acid constituting the core, the mixture of the carbamate of a basic amino acid and the biologically active substance or the biologically active substance to be coated by a coating layer containing the carbamate of a basic amino acid. For example, cane sugar or the like may be used as seed core for the granulation. Otherwise, the carbamate of a basic amino acid, a mixture of the carbamate of a basic amino acid and the biologically active substance or the biologically active substance to be coated by the carbamate of a basic amino acid may separately be granulated by e.g. agitation granulation or pulverization granulation and classified to have a uniform particle size for use as the seed core. There is no particular restriction as to the particle size. However, a particle size within a range of from 20 to 42 mesh is usually preferred for the seed core.

For the granulation, a binder, an excipient, etc. may be used. As a preferred binder, polyvinylpyrrolidone or hydroxypropyl cellulose may be mentioned. Such a binder is preferably used in the form of a solution in water or in an organic solvent such as an alcohol, and it is usually supplied by spraying from an air atomizing spray nozzle although the manner may vary depending upon the granulation apparatus to be used. The binder is used usually in an amount within a range of from 0.2 to 50% by weight based on the entire core.

Further, a disintegrator may be added at the time of the granulation of the feed additive for ruminants of the present invention. The disintegrator may be incorporated in the core containing the carbamate of a basic amino acid, the core containing a mixture of the carbamate of a basic amino acid and the biologically active substance or the biologically active substance to be coated by a coating layer containing the carbamate of a basic amino acid. Otherwise, it may be incorporated to the coating layer containing the carbamate of a basic amino acid when the biologically active substance is coated with the carbamate of a basic amino acid. As the disintegrator, a conventional disintegrator may be employed. For example, it may be crystalline cellulose.

The specific gravity of the finally obtained feed additive is adjusted within a range of from 1.0 to 1.4, preferably from 1.0 to 1.3. The specific gravity of the feed additive depends upon both the core and the polymer soluble or swellable in water in an acidic region of a pH of at most 5. Therefore, both component may be subjected to the control of the specific gravity. However, it is usually convenient to control the specific gravity of the final feed additive by controlling the specific gravity of the core which is larger in amount than the polymer. For preparation of the feed additive of the present invention, if it is required to control the specific gravity to have a light weight, fillers for controlling the specific gravity having a specific gravity of at most 0.7, such as fine hollow sodium silicate balls, fine hollow sodium borosilicate balls, fine hollow calcium silicate balls or silas balloons, may be added in a suitable amount.

A substance having a specific gravity of less than 0.7 must be used in combination with an inorganic substance having a specific gravity of higher than 2.0 such as talc, kaolin, mica, bentonite, silica or diatomaceous earth. When a substance having a specific gravity of less than 0.7 is used alone for the granulation of the core, even if after coating with the acid sensitive polymer, the specific gravity is adjusted to obtain feed additive particles for ruminants having a specific gravity within a range close to the specific gravity of the gastric fluid of the rumen, the hygroscopicity becomes extremely high, and the industrial handling will be impossible. On the other hand, when a substance having a specific gravity of higher than 2.0 is used alone, it becomes difficult to produce after coating with the protective substance, particles having a specific gravity within the range close to the specific gravity (about 1.02) of the gastric fluid of the rumen.

The substance having a specific gravity of less than 0.7 and the substance having a specific gravity of higher than 2.0 are added in such proportions that after coating with the protective substance the specific gravity of the particles will be within the range close to the specific gravity of the gastric fluid of the rumen. However, as the amounts of such inorganic substances increase, the proportions of the carbamate of a basic amino acid and the biologically active substance used in combination in the particles decrease. Therefore, such inorganic substances are used usually in an amount within a range of from 0.5 to 45% by weight, preferably from 2 to 45% by weight, based on the entire core.

The substance having a specific gravity of less than 0.7 is used usually in an amount within a range of from 0.5 to 30% by weight. If the amount exceeds 30% by weight, the strength of the particles tends to be substantially low, and the handling will be difficult.

The granulated particles may be dried by either a stand-still drying method or a fluidized bed drying method.

In a case where the biologically active substance is coated by a coating layer containing the carbamate of a basic amino acid to obtain the core, the granules of the biologically active substance granulated in accordance with the above-mentioned method may be coated with the carbamate of a basic amino acid or with a mixture of the carbamate of a basic amino acid and other physiologically acceptable inorganic substance.

The physiologically acceptable inorganic substance to be used in combination for the purpose of controlling the surface smoothness or for the control of the specific gravity of the particles, includes talc, aluminum, kaolin, bentonite, silica and fine hollow sodium borosilicate. These substances may be used alone or in combination of two or more.

The inorganic substance is usually used in an amount within a range of from 0.5 to 450 parts by weight, preferably from 2 to 450 parts by weight, relative to 100 parts by weight of the carbamate of a basic amino acid.

The coating layer containing the carbamate of a basic amino acid is usually at least 4 parts by weight relative to 100 parts by weight of the biologically active substance to be coated.

The core of the carbamate of a basic amino acid, the core of a mixture of the carbamate of a basic amino acid and the biologically active substance or the core prepared by coating the granules of the biologically active substance with a coating layer containing the carbamate of a basic amino acid, thus prepared, will then be coated with a polymer soluble or swellable in water in an acidic region of a pH of at most 5.

This acid sensitive polymer coating layer is required to protect the core substance stable when the coated particles stay in the rumen of a ruminant for a long period of time and to readily elute the core substance in a relatively short period of retention time in the abomasum. The amount of the coating layer varies depending upon the size of the particles to be coated or the type of the coating agent to be used. However, it is usually within a range of from 8 to 200% by weight, preferably from 10 to 80% by weight, based on the particles prior to the coating.

The acid sensitive polymer coating layer is usually applied in such a state as dissolved in a solvent. However, it may be applied in the form of an emulsion by using an emulsifier.

The solvent to be used for this purpose may be any solvent so long as it is capable of dissolving the acid sensitive polymer and is non-toxic. For example, ethyl alcohol may be mentioned.

For the coating operation, the coating material may be supplied in a state in which a fusion-preventing agent, etc. as mentioned hereinafter are suspended, or may be supplied separately.

For the formation of the acid sensitive polymer coating layer, it is possible to employ any conventional coating method such as pan coating, fluidized coating, centrifugal fluidized coating, to coat the granules.

For the application of the acid sensitive polymer, talc, aluminum, stearic acid, etc. may be incorporated for the purposes of preventing fusion of the particles to one another, providing antistatic and water repellent properties or controlling the specific gravity.

The acid sensitive polymer used in the present invention must be stable under a weakly acidic or alkaline condition corresponding to the gastric fluid of the rumen of a ruminant and must disintegrate, swell or dissolve under a highly acidic condition corresponding to the gastric fluid in the abomasum. Examples of the acid sensitive polymer satisfying such conditions include a cellulose derivative such as diethylaminoethyl cellulose, an acetate derivative such as polyvinylacetaldiethylamino acetate, a polyalkylvinylpyridine such as poly-2-methyl-5-vinylpyridine, a copolymer of a vinylpyridine with styrene such as a 4-vinylpyridine/styrene copolymer or a 2-vinylpyridine/styrene copolymer, a copolymer of a vinylpyridine with acrylonitrile such as a methylvinylpyridine/acrylonitrile copolymer, a copolymer of a vinylpyridine with a methacrylate such as a 4-vinylpyridine/methyl methacrylate copolymer, a copolymer of a vinylpyridine with an acrylate such as a 2-vinylpyridine/ethyl acrylate copolymer, a three component copolymer of 2-vinylpyridine/styrene/methyl methacrylate, a copolymer of N,N-dimethylaminoethyl methacrylate with acrylates such as a three component copolymer of N,N-dimethylaminoethyl methacrylate/methyl methacrylate/butyl methacrylate, an N,N-ethylenediamine derivative of a styrene/dimethylfumarate copolymer or a styrene/maleimide copolymer, a reaction condensation product of terephthalic acid or maleic acid with N-n-butyldiethanol amine, and a benzylamine adduct of a polyester made of propylene glycol and maleic acid.

With respect to the process for the preparation of the feed additive for ruminants of the present invention and various additives, there may be mentioned known processes for the preparation and known additives such as a binder, an excipient, a disintegrator, a lubricant, a coloring agent and a taste modifier, may be mentioned, for example, as disclosed in Yakuzai Seizoho (Jo) Iyakuhin Kaihatsu Kiso Koza XI, p. 133–154, published by Chijin Shokan, in addition to those as described above.

According to the present invention, by incorporating the carbamate of a basic amino acid in the core coated with the acid sensitive polymer, it has been made possible to maintain the protecting properties in the rumen and the releasability in the abomasum at a level useful as a feed for ruminants.

Further, in the case where the carbamate of a basic amino acid and the biologically active substance such as L-lysine monohydrochloride which has high solubility in water and the aqueous solution of which shows acidity are used in combination, it is not necessary to use an inorganic substance having a high specific gravity such as basic magnesium carbonate or magnesium hydroxide. This is advantageous from the viewpoint of the particle design.

Furthermore, when a biologically active substance having low solubility in water is used in combination, the releasability in the abomasum can be improved.

Now, the present invention will be described in further detail with reference to Examples. However, it should be understood that the present invention is by no means restricted by these specific Examples.

For the feed additive for ruminants to be practically useful, it is considered that at least 75%, preferably at least 80%, of the amino acid salts in the additive of the present invention should be stable even when shaked for 24 hours in a McDougall buffer solution corresponding to the gastric fluid of the rumen and should be released when shaked for 3 hours in a Clark Lubs buffer solution corresponding to the gastric fluid of the abomasum. Therefore, in the following Examples, the evaluation was made on this basis.

McDougall buffer solution:

Prepared by dissolving 3.43 g of sodium hydrogencarbonate, 7.0 g of disodium phosphate $12H_2O$, 0.34 g of sodium chloride, 0.43 g of potassium chloride, 0.10 g of magnesium chloride $6H_2O$ and 0.05 g of calcium chloride in 1 liter of water and saturating carbon dioxide gas (pH 6.8).

Clark Lubs buffer solution:

Prepared by adding 50 ml of 0.2N potassium chloride and 10.6 ml of 0.2N hydrochloric acid to 139.4 ml of water (pH 2.0).

EXAMPLE 1

45 g of L-lysine fumarate (Lys/HOOC—CH=CH—COOH=2 mol/1 mol), 4.5 g of a L-lysine salt of L-lysine carbamate, 14.0 g of talc and 4.5 g of polyvinylpyrrolidone (K-90) were mixed in a mortar to obtain a substantially uniform mixture. While gradually adding 28 g of ethyl alcohol, this powder mixture was thoroughly kneaded to obtain a putty.

The putty was extruded by an extruder with an orifice having a diameter of 2.2 mm, followed by cutting to obtain cylindrical pellets having a diameter of about 2.0 mm. The pellets were rounded by Marumerizer (manufactured by Fuji Powdal K. K.) and then dried at 45° C. The dried particles thus obtained were sieved to obtain particles of from 8 to 9 mesh (2.00–2.38 mm in diameter) in a yield of 95%.

Coating of particles

The preparation of a solution for coating the particles thus obtained, was conducted in the following manner.

Namely, 60 g of ethyl alcohol was added to a mixture comprising 3.0 g of a copolymer of 70% by weight of 4-vinylpyridine with 30% by weight of styrene (reduced viscosity at a concentration of 0.5 g/dl in ethyl alcohol: $\eta_{sp/c}=0.75$), 3.25 g of aluminum powder, 3.25 g of talc powder and 0.5 g of stearic acid, and the mixture was stirred at room temperature for 3 hours to obtain a suspension for coating.

The particles were introduced into Mechanomill (manufactured by Okada Seiko K. K.). Compressed air was blown thereto, and the suspension for coating was sprayed while rotating the particles. In such a manner, the solvent was evaporated, and the coating operation was continued until the weight of the coating layer reached 29.8% by weight based on the entire coated particles. Here, the weight of the coating layer was obtained as the difference between the weight after drying at 45° C. for 5 hours and the weight of the core before coating.

Shaking test in artificial gastric fluid

After shaking in the McDougall buffer solution at 39° C. for 24 hours, 95.4% of the L-lysine salt remained, thus indicating excellent protecting properties. Further, by shaking in the Clark Lubs buffer solution at 39° C. for 1 hour, a total of 96.0% of the L-lysine and the L-lysine salt eluted, and by shaking for 2 hours, 100% eluted, thus indicating excellent disintegrating properties.

COMPARATIVE EXAMPLE 1

49.5 g of L-lysine fumarate (Lys/HOOC—CH=CH—COOH=2 mol/1 mol), 14.0 g of talc and 4.5 g of polyvinylpyrrolidone (K-90) were mixed in a mortar to obtain a substantially uniform mixture. While gradually adding 15 g of water, this powder mixture was thoroughly kneaded to obtain a putty. The putty was granulated in the same manner as in Example 1 to obtain particles of from 8 to 9 mesh (2.00–2.38 mm in diameter).

The particles were coated with the same suspension for coating as used in Example 1 until the weight of the coating layer became 29.8% by weight based on the entire coated particles.

After shaking in the McDougall buffer solution at 39° C. for 24 hours, 86.2% of the L-lysine salt remained. Further, by shaking in the Clark Lubs buffer solution at 39° C., the eluted L-lysine salt was 36.4% in one hour and 70.8% in 2 hours, thus indicating that the elution rate is slow as compared with Example 1.

EXAMPLE 2

50 g of L-lysine monohydrochloride, 10 g of a L-lysine salt of L-lysine carbamate, 10.0 g of talc and 5.0 g of polyvinylpyrrolidone (K-90) were mixed in a mortar to obtain a substantially uniform mixture. While gradually adding 15 g of ethyl alcohol, this powder mixture was thoroughly kneaded to obtain a putty. The putty was granulated in the same manner as in Example 1 to obtain particles of from 8 to 9 mesh. The particles were coated with the same suspension for coating as used in Example 1 until the weight of the coating layer became 30.0% by weight based on the entire coated particles.

After shaking in the McDougall buffer solution at 39° C. for 24 hours, 93.6% of the L-lysine salt remained. Further, by shaking in the Clark Lubs buffer solution at 39° C. for 2 hours, 92.9% of the L-lysine salt eluted, and by shaking for 3 hours, 100% eluted.

EXAMPLE 3

50 g of L-lysine monohydrochloride, 10 g of a L-lysine salt of L-lysine carbamate, 10.0 g of talc and 5.0 g of polyvinylpyrrolidone (K-90) were mixed in a mortar to obtain a substantially uniform mixture. While gradually adding 15 g of ethyl alcohol, this powder mixture was thoroughly kneaded to obtain a putty. This putty was granulated in the same manner as in Example 1 to obtain particles of from 8 to 9 mesh.

Preparation of coating agent 60 g of ethyl alcohol was added to a mixture comprising 3.0 g of a copolymer of N,N-dimethylaminoethyl methacrylate, methyl methylacrylate and butyl methacrylate (Eudragit E100, trade name, Röhm Pharma Co., West Germany), 3.5 g of aluminum powder and 3.5 g of talc powder, and the mixture was stirred at room temperature for 3 hours to obtain a suspension for coating. The above-mentioned particles were coated with this suspension until the weight of the coating layer became 30.5% by weight based on the entire coated particles.

After shaking in the McDougall buffer solution at 39° C. for 24 hours, 90.4% of the L-lysine salt remained. Further, by shaking in the Clark Lubs buffer solution at 39° C. for 1 hour, 100% of the L-lysine salt eluted.

EXAMPLE 4

40 g of L-lysine stearate, 50 g of L-lysine monohydrochloride, 4.0 g of a L-lysine salt of L-lysine carbamate, 4.0 g of talc and 4.0 g of polyvinylpyrrolidone (K-90) were mixed in a mortar to obtain a substantially uniform mixture. While gradually adding 27 g of ethyl alcohol, this powder mixture was thoroughly kneaded to obtain a putty. This putty was granulated in the same manner as in Example 1 to obtain particles of from 8 to 9 mesh.

The particles were coated with the same suspension for coating as used in Example 1 until the weight of the coating layer became 30.3% by weight based on the entire coated particles.

After shaking in the McDougall buffer solution at 39° C. for 24 hours, 96.0% of the L-lysine salt remained, thus indicating excellent protecting properties. Further, by shaking in the Clark Lubs buffer solution at 39° C. for 1 hour, the total of 70.5% of the L-lysine and the L-lysine salt eluted, by shaking for 2 hours, 81.3% eluted, and by shaking for 3 hours, 91.2% eluted, thus indicating excellent disintegrating properties.

COMPARATIVE EXAMPLE 2

70 g of L-lysine stearate, 14 g of calcium carbonate and 7.0 g of polyvinylpyrrolidone (K-90) were kneaded in a mortar to obtain a substantially uniform mixture. While gradually adding 14 g of water, this powder mixture was thoroughly kneaded to obtain a putty. This putty was granulated in the same manner as in Example 1 to obtain particles of from 8 to 9 mesh.

The particles were coated with the same suspension for coating as used in Example 1 until the weight of the coating layer became 30.7% by weight based on the entire coated particles.

After shaking in the McDougall buffer solution at 39° C. for 24 hours, 98.5% of the L-lysine salt remained, thus indicating excellent protecting properties. However, by shaking in the Clark Lubs buffer solution at 39° C. for 1 hour, only 40.9% of the L-lysine stearate eluted, by shaking for 2 hours, 51.9% eluted and by shaking for 3 hours, 64.5% eluted, and by shaking for 5 hours, at last 80.4% eluted, thus indicating poor disintegrating properties.

EXAMPLE 5

100 g of L-lysine monohydrochloride, 10 g of microcrystalline cellulose and 1.0 g of gum arabic were mixed in a mortar to obtain a substantially uniform mixture. While gradually adding 16 g of water, this powder mixture was thoroughly kneaded to obtain a putty. This putty was granulated in the same manner as in Example 1 to obtain particles of from 9 to 10 mesh (1.68–2.00 mm in diameter). 14 g of the particles thus prepared were introduced into Mechanomill. While spraying a 5% ethanol solution of ethyl cellulose as a binder to the particles under rotation, 6.0 g of a L-lysine salt of L-lysine carbamate prepared by pulverizing to have a particle size for passing through a sieve of 200 mesh was deposited on their surface. The surface of the particles coated with the L-lysine salt of L-lysine carbamate was further coated with the same suspension for coating as used in Example 1 until the weight of the coating layer became 30.0% by weight based on the entire coated particles.

After shaking in the McDougall buffer solution at 39° C. for 24 hours, 90.2% of the L-lysine salt remained, thus indicating excellent protecting properties. Further, by shaking in the Clark Lubs buffer solution at 39° C. for 1 hour, a total amount of 89.8% of the L-lysine and the L-lysine salt eluted and by shaking for 2 hours, 100% eluted, thus indicating excellent disintegrating properties.

COMPARATIVE EXAMPLE 3

100 g of the L-lysine monohydrochloride, 10 g of microcrystalline cellulose and 1.0 g of gum arabic were mixed in a mortar to obtain a substantially uniform mixture. While gradually adding 16 g of water, this powder mixture was thoroughly kneaded to obtain a putty. This putty was granulated in the same manner as in Example 1 to obtain particles of from 9 to 10 mesh.

By using the same coating solution as used in Example 1, the particles were coated until the weight of the coating layer became 30.0% by weight based on the entire coated particles.

The coated particles wherein the L-lysine monohydrochloride was used as the core material were shaked in the McDougall buffer solution at 39° C. for 24 hours, whereupon the remaining L-lysine monohydrochloride was as small as 13.0%. Further, when shaked in the Clark Lubs buffer solution at 39° C. for 2 hours, 100% of the L-lysine hydrochloride eluted.

EXAMPLE 6

50 g of a L-lysine salt of L-lysine carbamate, 5 g of polyvinylpyrrolidone (K-90) and 30 g of calcium carbonate were mixed in a mortar to obtain a substantially uniform mixture. To this powder mixture, 65 g of ethyl alcohol was added, and the mixture was thoroughly kneaded to obtain a putty. This putty was extruded by an extruder with an orifice having a diameter of 2.2 mm, followed by cutting to obtain cylindrical pellets having a diameter of about 2.0 mm. The pellets were rounded by Marumerizer (manufactured by Fuji Powdal K. K.), dried at 45° C. and sieved to obtain particles of from 8 to 9 mesh (2.00–2.38 mm in diameter).

The particles were coated with the same suspension for coating as used in Example 1 until the weight of the coating layer became 29.3% by weight of the entire coated particles.

After shaking in the McDougall buffer solution at 39° C. for 24 hours, 100% of the L-lysine salt of L-lysine carbamate remained, thus indicating excellent protecting properties. Further, by shaking in the Clark Lubs buffer solution at 39° C. for 1 hour, 80.2% of the L-lysine salt of L-lysine carbamate eluted and by shaking for 2 hours, 100% eluted, thus indicating excellent disintegrating properties.

EXAMPLE 7

The coating of the pellets obtained in Example 6 was conducted by changing the composition of the coating material. Namely, 60 g of ethyl alcohol was added to a mixture comprising 3.0 g of Eudragit E100 and 7.0 g of talc powder, and the mixture was stirred at room temperature for 3 hours to obtain a suspension for coating. The pellets were coated with the suspension for coating until the weight of the coating layer became 29.6% by weight based on the entire coated particles.

After shaking in the McDougall buffer solution at 39° C. for 24 hours, 100% of the L-lysine salt of L-lysine carbamate retained, thus indicating excellent protecting properties. Further, by shaking in the Clark Lubs buffer solution at 39° C. for 1 hour, 100% of the L-lysine salt of L-lysine carbamate eluted, thus indicating excellent disintegrating properties.

EXAMPLE 8

30 g of a L-lysine salt of L-lysine carbamate, 3 g of polyvinylpyrrolidone (K-90) and 18 g of silica were mixed in a mortar to obtain a substantially uniform mixture. To this powder mixture, 36 g of ethyl alcohol was added, and the mixture was thoroughly kneaded to obtain a putty. The putty was granulated in the same manner as in Example 6 to obtain particles of from 8 to 9 mesh (2.00–2.38 mm in diamter).

The particles were coated with the same suspension for coating as used in Example 1 until the weight of the coating layer became 30.2% by weight based on the entire coated particles.

After shaking in the McDougall buffer solution at 39° C. for 24 hours, 82.5% of the L-lysine salt of L-lysine carbamate retained. Further, by shaking in the Clark Lubs buffer solution at 39° C. for 2 hours, 79.8% of the L-lysine salt of L-lysine carbamate eluted and by shaking for 3 hours, 100% eluted.

EXAMPLE 9

50 g of a L-lysine salt of L-lysine carbamate, 5 g of polyvinylpyrrolidone (K-90) and 30 g of calcium carbonate were mixed in a mortar to obtain a substantially uniform mixture. To this powder mixture, 20 g of water was added, and the mixture was thoroughly kneaded to obtain a putty. This putty was granulated in the same manner as in Example 6 to obtain particles of from 8 to 9 mesh.

The preparation of a solution for coating the particles thus obtained was conducted in the following manner. Namely, 60 g of ethyl alcohol was added to a mixture comprising 3.0 g of a copolymer of 70% by weight of 2-vinylpyridine and 30% by weight of styrene (reduced viscosity at a concentration of 0.5 g/dl in ethyl alcohol:

$\eta_{sp/c}=0.47$), 3.25 g of aluminum powder, 3.25 g of talc powder and 0.5 g of stearic acid, and the mixture was stirred at room temperature for 3 hours to obtain a suspension for coating.

The particles were coated with the suspension for coating until the weight of the coating layer became 32.0% by weight based on the entire coated particles.

After shaking in the McDougall buffer solution at 39° C. for 24 hours, 91.1% of the L-lysine salt of L-lysine carbamate remained. Further, by shaking in the Clark Lubs buffer solution at 39° C. for 3 hours, 95.2% of the L-lysine salt of L-lysine carbamate eluted.

EXAMPLE 10

In Example 9, only the coating material was changed. Namely, the particles were coated with the same suspension for coating as used in Example 3 until the weight of the coating layer became 30.0% by weight based on the entire coated particles.

After shaking in the McDougall buffer solution at 39° C. for 24 hours, 86.2% of the L-lysine salt of L-lysine carbamate remained. Further, by shaking in the Clark Lubs buffer solution at 39° C. for 1 hour, 96.0% of the L-lysine salt of L-lysine carbamate eluted. By shaking for 2 hours, 100% eluted, thus indicating excellent disintegrating properties.

COMPARATIVE EXAMPLE 4

A mixture of 60 g of L-lysine monohydrochloride, 5 g of polyvinylpyrrolidone (K-90) and 10 g of talc was thoroughly kneaded while gradually adding 15 g of ethyl alcohol to obtain a putty. The putty was granulated in the same manner as in Example 1 to obtain particles of from 8 to 10 mesh.

The particles were coated with the same suspension for coating as used in Example 1 until the weight of the coating layer became 30.2% by weight based on the entire coated particles.

The particles thereby obtained wherein the L-lysine salt was used as the core material, were shaked in the McDougall buffer solution at 39° C. for 24 hours, whereupon only 28.0% of the L-lysine monohydrochloride remained. Further, by shaking in the Clark Lubs buffer solution at 39° C. for 2 hours, 100% of the L-lysine salt eluted.

As compared with Examples 2 and 3, it is evident that the protecting properties are poor since the L-lysine salt of L-lysine carbamate was not incorporated.

COMPARATIVE EXAMPLE 5

55.6 g of L-lysine monohydrochloride, 44.4 g of L-lysine base, 5 g of polyvinylpyrrolidone (K-90) and 25 g of silica were mixed in a mortar to obtain a substantially uniform mixture. To this powder mixture, 11 g of water was added, and the mixture was thoroughly kneaded to obtain a putty.

The putty was granulated in the same manner as in Example 1 to obtain particles of from 8 to 9 mesh. The particles were coated with the same suspension for coating as used in Example 1 until the weight of the coating layer became 29.4% by weight based on the entire coated particles.

The particles thus obtained wherein the core materials were composed of L-lysine monohydrochloride and an equimolar amount of L-lysine base, were shaked in the McDougall buffer solution at 39° C. for 24 hours, whereupon only 58.3% of the L-lysines remained. Further, by shaking in the Clark Lubs buffer solution at 39° C. for 3 hours, 76.4% of the L-lysines eluted and by shaking for 3 hours, 92.7% eluted.

This indicates that even when L-lysine base was added as a basic substance, the protecting properties in the first stomach are low, and the releasing properties in the fourth stomach are low as compared with the case where no L-lysine base was added.

EXAMPLE 11

30 g of a L-ornithine salt of L-ornithine carbamate, 3 g of polyvinylpyrrolidone (K-90) and 18 g of silica were mixed in a mortar to obtain a substantially uniform mixture. To this powder mixture, 36 g of ethyl alcohol was added, and the mixture was thoroughly kneaded to obtain a putty.

The putty was granulated in the same manner as in Example 1 to obtain particles of from 8 to 9 mesh. The particles were coated with the same suspension for coating as used in Example 1, until the weight of the coating layer became 30.0% by weight based on the entire coated particles.

After shaking in the McDougall buffer solution at 39° C. for 24 hours, 82.5% of the L-ornithine salt of L-ornithine carbamate remained. Further, by shaking in the Clark Lubs buffer solution at 39° C. for 2 hours, 94.5% of the L-ornithine salt of L-ornithine carbamate eluted, and by shaking for 3 hours, 100% eluted.

EXAMPLE 12

50 g of D,L-methionine, 10 g of L-lysine salt of L-lysine carbamate, 5 g of polyvinylpyrrolidone (K-90), 10 g of talc and 15 g of ethyl alcohol were gradually added and thoroughly kneaded to obtain a putty. The putty was granulated in the same manner as in Example 1 to obtain particles of from 8 to 9 mesh.

The particles were coated with the same suspension for coating as used in Example 3 until the weight of the coating layer became 30.0% by weight based on the entire coated particles.

After shaking in the McDougall buffer solution at 39° C. for 24 hours, 90.4% of the D,L-methionine and the L-lysine salt remained. Further, by shaking in the Clark Lubs buffer solution at 39° C. for 1 hour, 100% of the D,L-methionine and the L-lysine salt eluted.

COMPARATIVE EXAMPLE 6

Into a centrifugal fluidized coating apparatus, 5.25 kg of Nonpareil 103 (manufactured by Froint Sangyo K. K.) as cane sugar crystals having a particle size of 20 to 24 mesh was introduced as seed core. While spraying from an air atomizing spray nozzle 640 g of a solution of 2% by weight of hydroxypropyl cellulose in water-/ethyl alcohol (weight ratio of water/ethyl alcohol=40/60), a mixture comprising 30 kg of D,L-methionine, 3 kg of basic magnesium carbonate and 6 kg of Microcel M-35 (fine hollow sodium borosilicate, manufactured by Asahi Glass Company Ltd.) was added, followed by granulation of core. After completion of the granulation, the granulated product was dried by a fluidized bed. The product was classified by means of a JIS standard sieve to obtain a particles of from 9 to 10 mesh.

The core thus obtained were coated in the same manner as in Example 9.

The specific gravity of the coated particles was 1.47.

After shaking in the McDougall buffer solution at 39° C. for 24 hours, 93.8% by weight of the D,L-methionine in the coated particles remained. However, when shaked in the Clark Lubs buffer solution for 1 hour, only 48.3% by weight of the D,L-methionine was released.

EXAMPLE 13

Into a centrifugal fluidized granulation coating apparatus CF-360 (manufactured by Froint Sangyo K. K.), 350 g of L-lysine hydrochloride crystals having a particle size of from 20 to 24 mesh were introduced as seed core, and 2,200 g of a powder mixture comprising L-lysine monohydrochloride, 2-hydroxy-4-methyl mercapto butyric acid, fine crystalline cellulose and a L-lysine salt of L-lysine carbamate each having a particle size of 100 mesh pass in a weight ratio of 4:4:1:2 was gradually added while rotating the seed core. Here, the granulation was conducted by spraying 2,000 g of a 4 wt % ethyl alcohol solution of hydroxypropyl cellulose as a binder.

The granulated product was dried in a fluidized bed dryer and classified by a standard sieve to obtain particles having a particle size of from 9 to 10 mesh.

The preparation of a solution for coating the particles thus obtained was conducted in the following manner. Namely, a copolymer of 70% by weight of 4-vinylpyridine and 30% by weight of styrene (reduced viscosity at a concentration of 0.5 g/dl in ethyl alcohol: $\eta_{sp/c} = 1.30$) and stearic acid in an amount of 1/6 thereof were dissolved in ethyl alcohol to bring the total amount of this copolymer and stearic acid used for the purpose of preventing the fusion of the particles to one another and imparting hydrophobic properties, to a level of 4% by weight.

1.5 kg of the particles were charged into a centrifugal fluidized coating apparatus and rotated at a speed of 200 rpm. While spraying from a air atomizing spray nozzle 5.5 kg of this coating solution to the particles flowing in the apparatus, fine powder of talc was added for the purpose of preventing the coagulation of the particles to one another, adjusting the specific gravity and providing antistatic properties.

By supplying the ethyl alcohol solution containing the copolymer and stearic acid, and talc in a weight ratio of 13.5:1, the weight ratio of the copolymer, the talc powder and the stearic acid was adjusted to be 30:65:5. The particles were coated in the same manner as described above until the weight of the coating layer became 25.0% by weight.

The specific gravity of the particles was measured with an air comparison pycnometer (this apparatus was used in the measurement of the specific gravity hereinafter) and found to be 1.08.

After shaking in the McDougall buffer solution at 39° C. for 24 hours, a total of 91.5% by weight of the L-lysine salts and 2-hydroxy-4-methyl mercapto butyric acid in the particles thus obtained, remained. Further, by shaking in the Clark Lubs buffer solution at 39° C. for 2 hours, 96.5% by weight of the L-lysine salts and the 2-hydroxy-4-methyl mercapto butyric acid eluted.

EXAMPLE 14

Into a centrifugal fluidized granulation coating apparatus, 350 g of Nonpareil 103 i.e. sugar cane crystals having a particle size of from 20 to 24 mesh was charged as seed core, and 2,100 g of a powder prepared by mixing L-lysine hydrochloride, D,L-methionine, a L-lysine salt of L-lysine carbamate and talc, each having a granularity with 200 mesh pass, in a weight ratio of 9:9:2:1, was gradually added while rotating the seed core. Here, the granulation was conducted by spraying 1,900 g of a solution of 4% by weight of hydroxypropyl cellulose in water/ethyl alcohol (weight ratio of water/ethyl alcohol=40/60) as a binder.

The granulated product was dried in a fluidized bed dryer and sieved by a standard sieve to obtain particles having a size of from 9 to 10 mesh.

The preparation of a solution for coating the particles thus obtained was conducted in the following manner. Namely, a copolymer of N,N-dimethylaminoethyl methacrylate, styrene and ethyl acrylate in the weight ratio of 35:55:10 (reduced viscosity at a concentration of 1.0 g/dl in methyl ethyl ketone: $\eta_{sp/c} = 0.25$) was dissolved in acetone to obtain a coating solution having a copolymer concentration of 4.0% by weight.

Into a centrifugal fluidized coating apparatus, 1.5 kg of the particles were charged, and rotated at a speed of 200 rpm. While spraying from an air atomizing spray nozzle 7.0 kg of this coating solution to the particles flowing in the apparatus, fine powder of talc was added for the purposes of preventing coagulation of the particles to one another, controlling the specific gravity and providing antistatic properties.

The weight ratio of the copolymer and the talc powder was adjusted to be 1:1, by supplying the acetone solution containing the copolymer and talc in the weight ratio of 25:1.

The particles were coated as described above until the weight of the coating layer became 23.0% by weight. The specific gravity of the particles was 1.12.

After shaking in the McDougall buffer solution at 39° C. for 24 hours, a total of 93% by weight of the L-lysines and the D,L-methionine in the particles thus obtained, remained. Further, by shaking in the Clark Lubs buffer solution at 39° C. for 2 hours, 98.2% by weight of the D,L-methionine hydrochloride and the D,L-methionine eluted.

Test method, buffer solution

Into an Erlenmeyer flask having an internal capacity of 300 ml, 1 g of a nutrient for a ruminant obtained in each Example was added, and 200 ml of the McDougall artificial solution corresponding to the gastric fluid of the rumen or the Clark Lubs artificial gastric fluid corresponding to the gastric fluid of the abomasum was added thereto, and the mixture was shaked in a constant temperature tank at a temperature of 39°±0.5° C. under 91 reciprocations per minute with an amplitude of 4 cm. The elution of the amino acid was quantitatively analyzed by high speed liquid chromatography after expiration of 24 hours in the case of the McDougall buffer solution and after 3 hours in the case of the Clark Lubs buffer solution.

As is evident from the above Examples and Comparative Examples, when the feed additive composition for ruminants of the present invention is orally administered to a ruminant, the elution of the biologically active substance to the McDougall artificial saliva corresponding to the gastric fluid of the rumen can be suppressed at a very low level, and the elution of the biologically active substance in the Clark Lubs buffer solution of pH 2 corresponding to the gastric fluid of the abomasum is very high. Thus, the present invention provides a feed additive composition for ruminants which is capable of suppressing the decomposition of the biologically active substance so that the substance is effectively digested and absorbed in the abomasum or the subsequent digestive tracts, and its industrial significance is substantial.

We claim:

1. A feed additive for ruminants, consisting essentially of:
   a core containing a carbamate of L-lysine or L-ornithine which is coated with a polymer coating agent soluble or swellable in water in an acidic region of a pH of at most 5.

2. The feed additive for ruminants according to claim 1, wherein the core is made of a mixture of a biologically active substance and the said carbamate salt.

3. The feed additive for ruminants according to claim 2, wherein the biologically active substance is at least one member selected from the group consisting of D,L-methionine, L-lysine monohydrochloride, L-threonine, L-tryptophan, L-leucine, L-isoleucine, L-valine, L-cysteine, L-histidine monohydrochloride, L-arginine and L-phenylalanine.

4. The feed additive for ruminants according to claim 1, wherein the core have a double layered structure comprising a inner layer of at least one biologically active substance and a coating layer formed thereon containing said carbamate salt.

5. The feed additive for ruminants according to claim 1, wherein the coating agent is in an amount of from 8 to 200 parts by weight relative to 100 parts by weight of the core.

6. The feed additive for ruminants according to claim 1, wherein the ruminants are cattle, sheep or goat.

7. The feed additive for ruminants according to claim 1, wherein the coating agent is a copolymer of dimethylaminoethyl methacrylate with an alkyl (meth)acrylate, or a copolymer of a vinylpyridine selected from the group consisting of 2-methyl-5-vinylpyridine, 2-vinylpyridine, 4-vinylpyridine, 2-vinyl-6-methylpyridine and 2-vinyl-5-ethylpyridine with an acrylic compound selected from the group consisting of an alkyl (meth)acrylate, (meth)acrylic acid and acrylonitrile or with styrene.

8. The feed additive for ruminants according to claim 1, which has a specific gravity of from 1.0 to 1.4.

9. The feed additive for ruminants according to claim 8, wherein an inorganic substance selected from the group consisting of fine sodium silicate balls, fine hollow sodium borosilicate balls, fine hollow calcium silicate balls and silas balloons is used for controlling the specific gravity of the feed additive.

10. The feed additive for ruminants according to claim 1, which contains an inorganic substance having a specific gravity of from 0.05 to 0.7 in an amount of 0.5 to 45% by weight based on the entire core containing the carbamate of a basic amino acid.

* * * * *